United States Patent
Rowswell

[11] Patent Number: 5,906,359
[45] Date of Patent: May 25, 1999

[54] CATTLE GATE AND FENCE SYSTEMS

[76] Inventor: Kevin J. Rowswell, Box 87, Cut Knife, Saskatchewan, Canada, S0M 0N0

[21] Appl. No.: 08/910,391

[22] Filed: Aug. 13, 1997

[51] Int. Cl.[6] .................................................. E04H 17/00
[52] U.S. Cl. ................................................ 256/14; 256/1
[58] Field of Search .................................... 256/14, 15, 16, 256/17, 1, 13.1; 404/6, 10, 13; 49/131, 58; 52/173.2, DIG. 9; 403/2

[56] References Cited

U.S. PATENT DOCUMENTS

| Re. 12,385 | 8/1905 | Bruley. | |
|---|---|---|---|
| 79,141 | 6/1868 | McFarlin. | |
| 446,852 | 2/1891 | Davis. | |
| 978,505 | 12/1910 | Stewart. | |
| 1,356,302 | 10/1920 | Mills. | |
| 1,694,109 | 12/1928 | Tockar. | |
| 1,982,569 | 11/1934 | Byrd. | |
| 2,309,041 | 1/1943 | Booker et al.. | |
| 2,724,156 | 11/1955 | Shaw. | |
| 2,874,493 | 2/1959 | Mandel. | |
| 3,602,109 | 8/1971 | Harrington | 256/13.1 |
| 3,661,359 | 5/1972 | Walker | 256/13.1 X |
| 3,764,446 | 10/1973 | Martin | 404/6 X |
| 3,925,929 | 12/1975 | Montgomery | 403/2 X |
| 4,022,434 | 5/1977 | Moore | 256/1 |
| 4,022,452 | 5/1977 | Dupre | 256/1 X |
| 4,090,694 | 5/1978 | Vincent | 256/13.1 |
| 4,270,873 | 6/1981 | Laehy et al. | 256/1 X |
| 4,609,184 | 9/1986 | Elkins, Sr. | 256/14 |
| 4,822,206 | 4/1989 | Roussel et al. | 404/10 X |
| 5,097,785 | 3/1992 | Zidek. | |
| 5,397,197 | 3/1995 | Beavers | 404/10 |

FOREIGN PATENT DOCUMENTS

| 561800 | 4/1957 | Italy | 404/10 |
|---|---|---|---|
| 1017759 | 5/1983 | U.S.S.R. | 256/13.1 |
| 1368772 | 10/1974 | United Kingdom | 256/13.1 |
| 2231345 | 11/1990 | United Kingdom | 256/1 |

*Primary Examiner*—Harry C. Kim
*Attorney, Agent, or Firm*—Andrew Hicks; Scott & Aylen

[57] ABSTRACT

An improvement in fence systems adjacent cattle gates is provided. Specifically, the fence system provides a fence post having a bumper system such that in the event that a vehicle passing the fence system hits the upright, the risk of damage to the fence system is minimized. In one form of the invention, the uprights at the end of the fence system are provided with a resilient rubber bumper attached to the upright which is preferably fabricated from discarded or used tires.

6 Claims, 4 Drawing Sheets

CATTLE GATE AND FENCE SYSTEMS

FIELD OF THE INVENTION

An improvement in fence systems adjacent cattle gates is provided. Specifically, the fence system provides a fence post having a bumper system such that in the event that a vehicle passing the fence system hits the upright, the risk of damage to the fence system is minimized. In one form of the invention, the uprights s at the end of the fence system are provided with a resilient rubber bumper attached to the upright which is preferably fabricated from discarded or used tires.

BACKGROUND OF THE INVENTION

Cattle gates as a system for preventing cattle from wandering outside of a specific enclosure while also allowing vehicles or people to pass through the gate are well known. In the past, cattle gates have taken many forms including standard hinge gates which are opened either manually or automatically when a vehicle or person passes through the gate or a grate system which provides a permanent opening in the fence but discourages cattle from passing through the opening.

A number of problems exist with both standard hinge gates and cattle grates which lead to either inconvenience to a vehicle operator or the risk of cattle escaping from the enclosure. For example a manual gate requires that a person physically opens the gate to allow the vehicle to pass through, and subsequently requires a person to close the gate after the vehicle has passed through the gate. In the event that a driver of a vehicle is the sole occupant in the vehicle, this requires that the driver exits and re-enters the vehicle two times for each gate that is passed through. Furthermore, a standard hinge gate requires a latching mechanism to keep the gate closed which if either through malfunction or improper use may result in the gate opening at an improper time which allows cattle to escape. In order to overcome the inconvenience of a manual gate automatic gates have been developed which detect the presence of a vehicle near the gate and which automatically open the gate and subsequently close the gate when the vehicle has passed through. However, due to the mechanical and/or electronic complexity of such automatic gates, climate or other factors, such gates may be inappropriate due to expense and/or reliability in many circumstances.

Accordingly, in the development of systems to keep cattle enclosed within a field, a common form of gate is to provide a cattle grate or "Texas gate" type system. A cattle grate is positioned over a ditch and within an opening of an existing fence system. The grate is provided with a series of horizontal members spaced apart sufficiently for an animal's leg to fall through but close enough that a vehicle can pass over. Thus, while a vehicle can pass easily and safely over such a grate, cattle do not attempt to go over the grate and through the opening as their feet would fall through the members into the ditch below. Accordingly, the cattle stay within the pasture. Furthermore, in view of the lack of a specific barrier which must be opened, closed and maintained, the cattle grate system provides convenience to a vehicle operator in that the vehicle driver does not need to physically get out of the vehicle in order to pass through the gate. In fact, a vehicle need only slow down upon approaching and passing through a cattle grate and it is not normally required that the vehicle actually stops.

The problem with cattle grates arise when a large vehicle may have to pass through the opening while subsequently making a turn near the opening. In such a circumstance, as the vehicle turns, it may brush against the uprights of the adjacent fence posts resulting in damage to the fence posts and creating a hole in the fence system which may enable cattle to escape.

Furthermore, in the winter time, it is often necessary that a snow plow needs to travel across a cattle grate to remove snow from around the fence system. However, existing fence systems often do not allow a wide snow plow with its blade to pass through the gate without causing damage to the uprights at the side of the grate.

Accordingly, there has been a need for an improved cattle grate and fence system which overcomes the problems outlined above. In particular, there has been a need for a fence post system and cattle grate wherein the upright fence posts adjacent the cattle grate are provided with a flexible surface or a bumper so that in the event that a vehicle hits the upright, the upright will not break but rather the impact will be absorbed by the flexible surface or bumper system. Still further, there has been a need for a secondary fence post system wherein a complete section of the fence adjacent the cattle grate can be readily and easily removed from the ground in the event that a particularly wide vehicle is passing through or around the cattle grate.

A search of the prior art has revealed a number of patents to various related systems but none which address the specific problems as outlined above. For example, U.S. Pat. No. 2,874,493 discloses an automatic signal and barrier device for a railway crossing which includes resilient and flexible poles; U.S. Pat. No. 5,097,785 discloses a marine bumper which includes a hangar assembly for a tire bumper; U.S. Pat. No. 79,141, U.S. Pat. No. 446,852 and U.S. Pat. No. 2,309,041 disclose hinge fence post systems or support posts including pins for securing the posts in an upright position; U.S. Pat. No. 1,356,302 discloses a railway gate having a hinge support which includes a shear pin device; U.S. Pat. No. 1,694,109, U.S. Pat. No. 1,982,569 and U.S. Pat. No. 2,724,156 disclose socket like reciprocals for receiving poles; and, U.S. Pat. No. 12,385 and U.S. Pat. No. 978,505 disclose fence posts having hollow chambers and caps for sealing the chambers. However, none of the above patents disclose a vertical fence post with a bumper system adapted for use in and around a cattle grate.

SUMMARY OF THE INVENTION

In accordance with the invention, a fence post system for fencing ground is provided, the fence post system comprising:

an upright including an outwardly extending bumper along one side of the upright, the bumper and upright adapted for absorbing horizontal displacement of the bumper with respect to the upright.

In further embodiments of the invention, the bumper system comprises at least one tire attached to the upright, the tire having an outer rolling surface and wherein the at least one tire is attached to the upright through the outer rolling surface. In a preferred embodiment, the at least one tire is two tires and the two tires are attached to one another through their respective outer rolling surfaces. Discarded automobile tires are particularly useful.

Furthermore, the tires may be hinged with respect to the upright for allowing the tires to pivot with respect to the upright between a first position and a second position and wherein the tires are biased to a central position generally midway between the first and second positions.

Still further in an alternate embodiment, the upright is provided with a socket, the socket adapted for placement in the ground wherein the upright has a lower end adapted for mating engagement within the socket. The upright and socket may also be adapted to prevent rotation of the upright within the socket.

Other embodiments are provided wherein the upright includes an upper portion and a lower portion with the upper portion adapted for pivotal movement with respect to the lower portion, and shearing means are provided to lock the upright in a vertical position with the shearing means adapted to allow pivotal movement in the event a threshold bending force is applied to the upper portion.

Still further, the upright may include an upper portion and a lower portion wherein the upper portion is adapted for pivotal movement with respect to the lower portion through a resilient and flexible joint. Alternatively, the upright may be provided with biasing means to bias the upright in a vertical position, the biasing means adapted to allow pivotal movement in the event a threshold bending force is applied to the upper portion.

The invention also provides a fence and gate system comprising a grate including a plurality of horizontal members in spaced relationship supported over a ground depression and at least one upright adjacent and a fixed distance from the grate, the upright including a bumper having a horizontal length generally corresponding to the fixed distance and extending toward the grate, the bumper and upright adapted for absorbing horizontal displacement of the bumper with respect to the upright.

Still further, the a more specific embodiment of the invention provides a fence post system for fencing ground, the fence post system comprising an upright including two tires extending outwardly from one side of the upright wherein each tire has an outer rolling surface and wherein each tire is attached to the upright and to each other through the outer rolling surface and socket means adapted for placement in the ground wherein the upright has a lower end adapted for mating engagement within the socket means.

DESCRIPTION OF THE DRAWINGS

These and other features of the invention will be more apparent from the following description in which reference is made to the appended drawings wherein.

DESCRIPTION OF THE INVENTION

Figure 1:
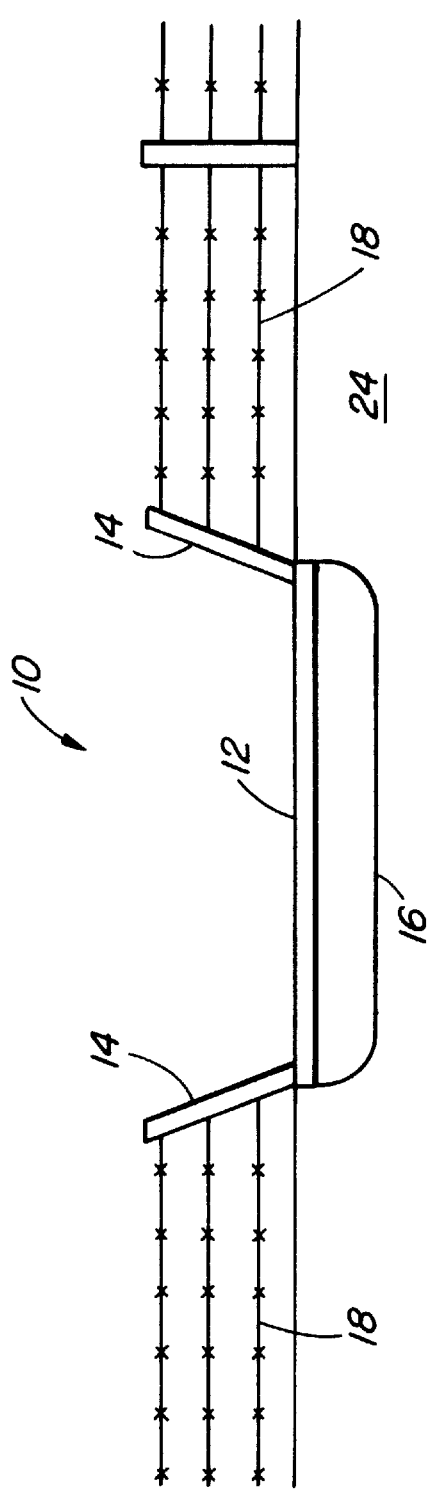
FIG. 1 is a side view of a typical cattle grate and fence system according to the prior art.

With reference to FIG. 1, a typical cattle grate system 10 according to the prior art is shown. The cattle grate system 10 generally includes a grate 12 which includes a plurality of spaced and horizontal pipes with uprights 14 at the outer sides of the grate. The grate 12 is placed over a depression 16 which is contoured to create a cavity beneath the grate 12. Adjacent each upright 14 is a standard fence system 18 connected to each upright 14 and which is typically used to set-up or define an enclosure. Accordingly, an opening in the fence is provided by the cattle grate system 10 enabling vehicles to pass over the grate 12 which also discourages or prevents cattle from moving through the opening.

Figure 2:
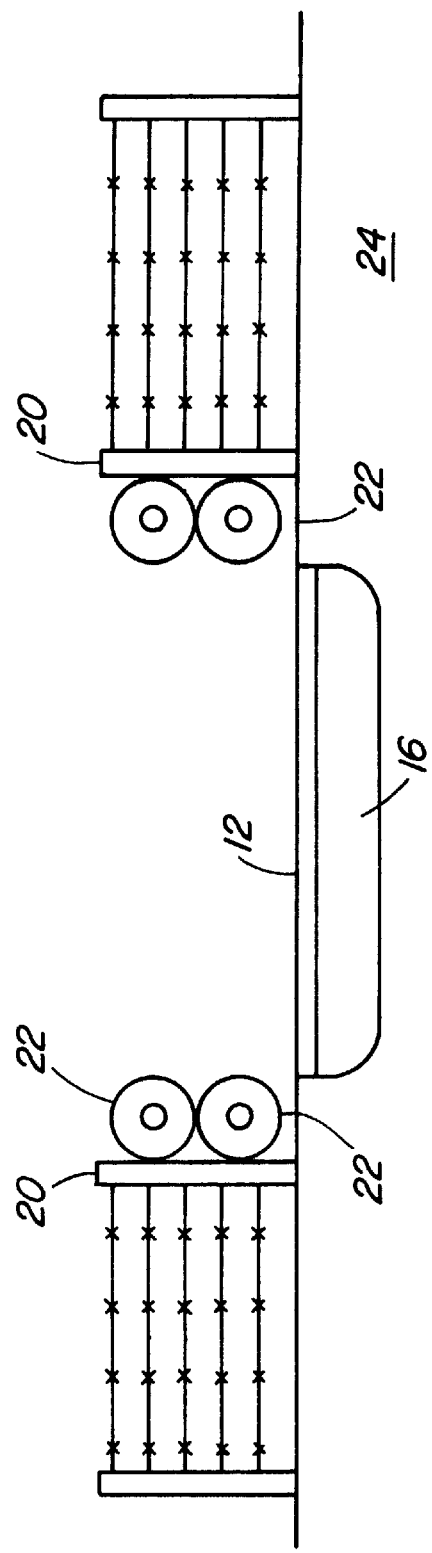
FIG. 2 is a side view of a cattle grate in accordance with the invention.

With reference to FIG. 2, a cattle grate and fence system in accordance with the invention is shown. According to the invention, the uprights 20 are spaced away from the grate 12 and provided with a resilient rubber bumper 22 to fill or block the space between the vertical upright 20 and the edge of the grate 12. Preferably, as shown in FIG. 2, the resilient bumper includes two tires attached both to the upright 20 and to each other. Accordingly, the upright provides a flexible barrier such that in the event that a vehicle scrapes the tires, the tires will flex and bend without causing damage to the upright 20.

Figure 3:
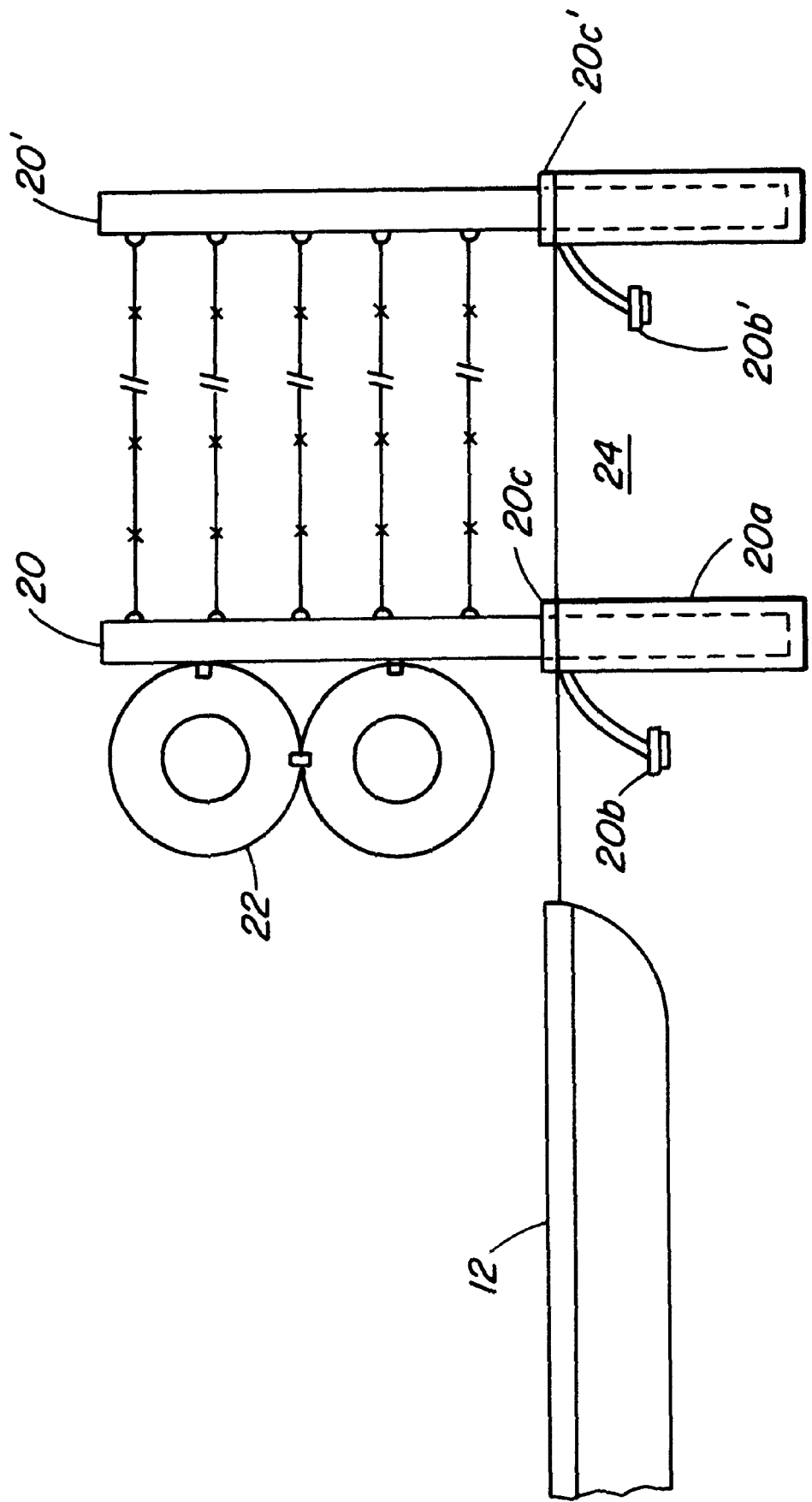
FIG. 3 is a side view of one side of a cattle grate in accordance with the invention.
Figure 4:
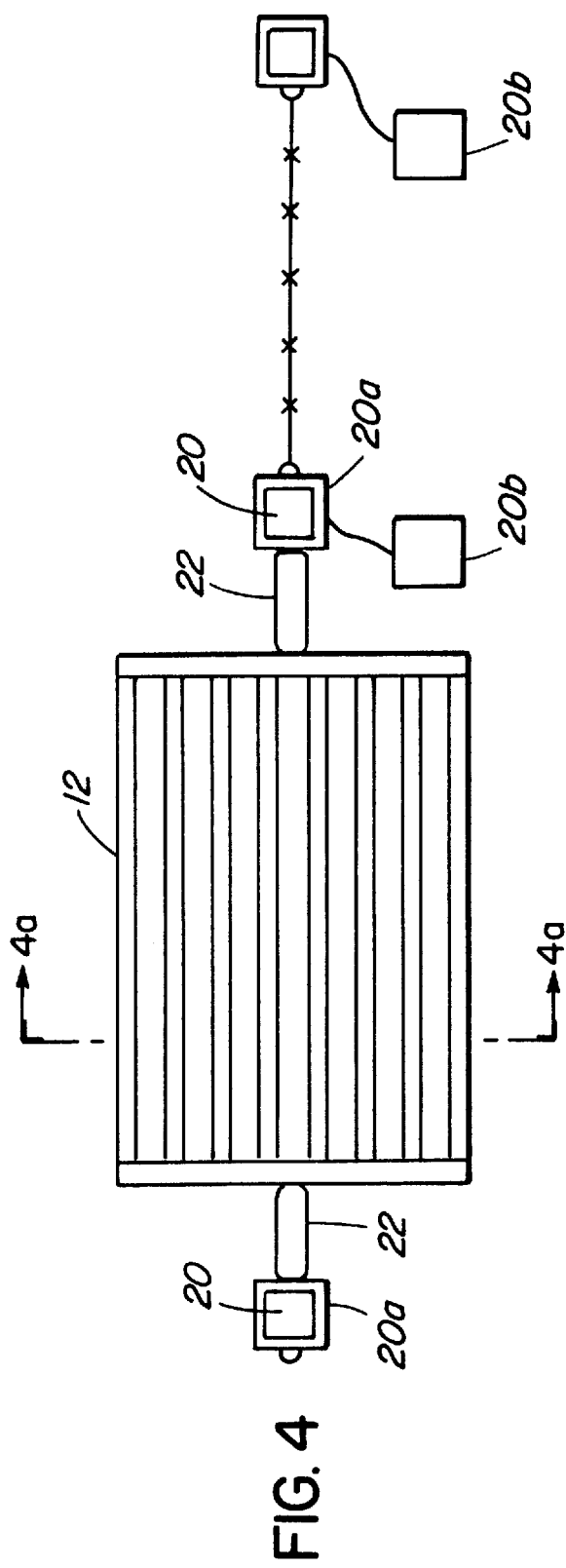
FIG. 4 is a top view of a cattle grate system in accordance with the invention.
Figure 4A:
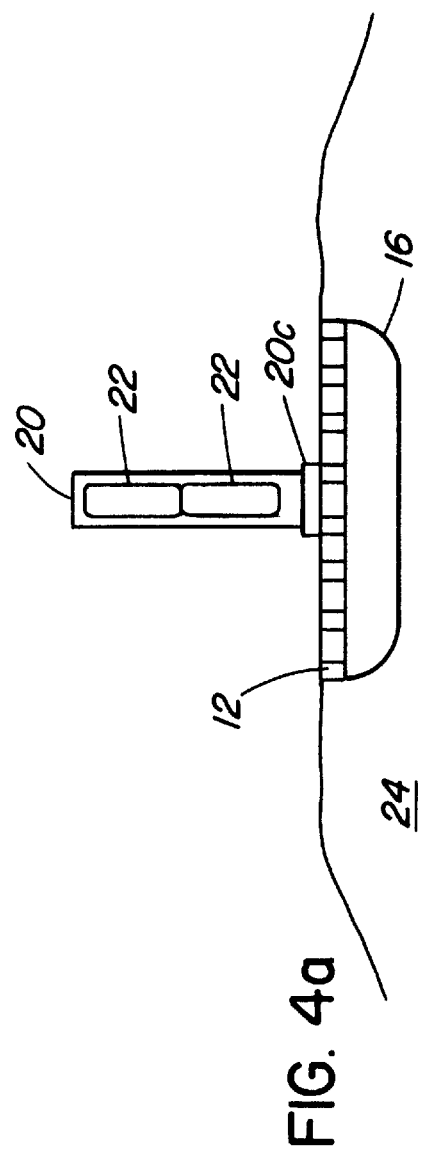

With reference to FIGS. 3, 4 and 4a, further details of the fence system are shown. Preferably, the upright 20 is a round or square post which is received within a round or square socket 20a in the ground 24 wherein the socket 20a is generally flush with the ground. A square post may be preferred to prevent rotation of the upright within the socket 20a. Still further, the socket 20a, enables the upright 20 to be removed from the socket 20a in the event that a particularly wide vehicle needs to pass through the gate system 10. A cover 20b may also be provided so that if the upright 20 is removed, water or dirt can be prevented from entering the socket 20a. A collar 20c may also be provided to set the height of the upright with respect to the ground. While it is preferred that the tires 22 are rigidly attached to the upright 20, it is contemplated that the tires 22 may be configured to the upright in such a manner that they are hinged with respect to the upright 20 but are also biased such that the tires 22 remain generally parallel with the direction of the fence system and fill the space between the upright 20 and the edge of the grate 12.

In a further embodiment, a portion of the fence system adjacent the gate may be completely removable by providing a second removable upright 20' a short distance from the main upright. This embodiment provides further flexibility to large vehicle operators. For example, a snow plow operator may completely remove a section of the fence post to enable a snow plow to move over the cattle grate clearing snow from the area and then be able to replace the section of fencing when the snow clearing has been completed. As indicated above, the socket 20a is preferably provided with a cap 20b to cover the socket 20a when the upright is removed so as to prevent the socket from filling with snow.

Furthermore, while it is contemplated that whole round tires are utilized for the bumper system, other bumpers may be developed utilizing other materials such as half tires or other flexible materials such as springs.

The main advantage of using tires as a bumper, is that they are plentiful and, hence, inexpensive. Tires are also highly durable for this application and will retain their strength and relative rigidity after repeated compressions from all directions. Tires will also provide sufficient resilience so that cattle testing the fence system would not be able to push against the tires with ease and, thus, escape the enclosure.

Figure 5A:
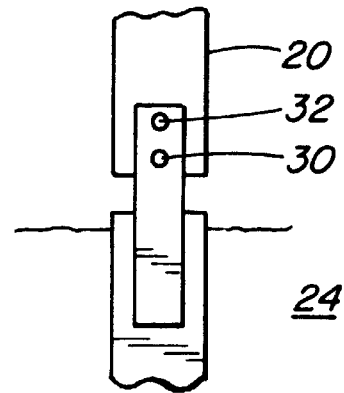
FIG. 5a shows an alternate embodiment of an upright having a shear pin.

With reference to FIG. 5a, an alternate embodiment of the upright 20 is provided wherein the upright includes a pivot 30 and shear pin 32 so that in the event that a vehicle strikes the bumper system and upright 20 with sufficient force to bend the upright 20, the shear pin 32 will fail enabling the upright 20 to pivot and collapse without damage to the upright 20. In this case, if a vehicle operator causes the shear pin 32 to fail, the shear pin 32 can be replaced and the upright 20 returned to its upright position without difficulty.

Figure 5B:
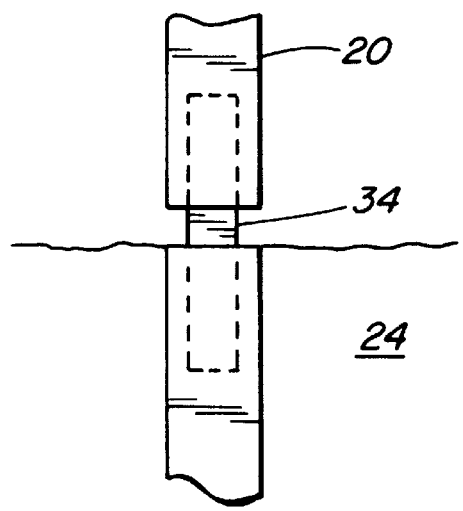
FIG. 5b shows an alternate embodiment of an upright having a resilient rubber universal joint.

Still further, and with reference to FIG. 5b, an upright 20 having a flexible joint 34 at its base may also be provided so that in the event that a vehicle strikes the upright with sufficient force to cause the upright to distort, the upright 20 will flex away with the vehicle. As soon as the force is released, that is once the vehicle has passed through the uprights, the upright will rebound to the upright position. In this embodiment, the upright 20 may be manufactured in two components—an above ground portion which is connected to a below ground portion through a flexible joint 34 such as a rubber insert or spring.

Figure 5C:
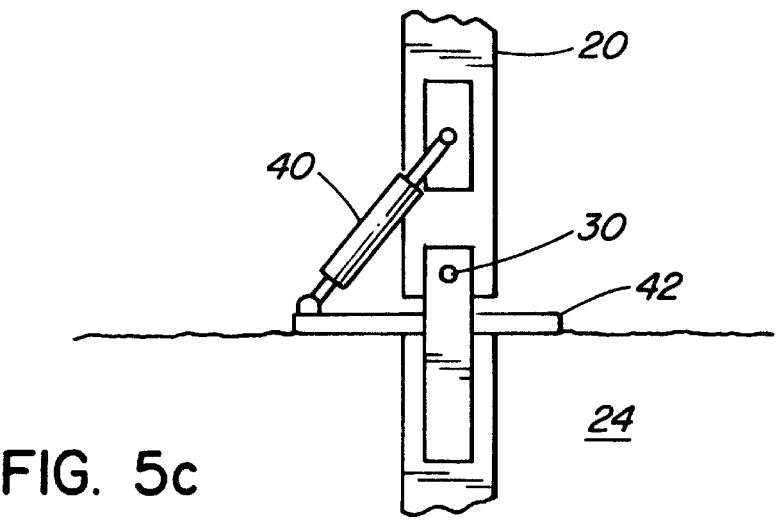
FIG. 5c shows an alternate embodiment of an upright having a spring.

Still further and with reference to FIG. 5c, a further embodiment of the upright 20 is shown wherein the upright is manufactured in two components and includes a pivot as described above. In this embodiment, a spring 40 is configured between the above ground portion of the upright and the below ground portion. A plate 42 extending outwardly from the below ground portion may be used to anchor the spring 40 at a favourable angle with respect to the pivot such that in the event that a vehicle strikes the tires the upright will return to the vertical position by the action of the spring 40 after the force is released. In each of the embodiments as shown in FIGS. 5a, 5b and 5c, a socket 20a as described above may be utilized.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

I claim:

1. A fence post comprising:

an upright having a bumper, the bumper adapted for absorbing a compressive force with respect to the upright and rotational displacement of the bumper with respect to the upright wherein the bumper includes two tires attached to the upright and to each other through their respective outer rolling surfaces and wherein the tires are hinged with respect to the upright for allowing the tires to pivot with respect to the upright between a first position and a second position and wherein the tires are biased to a central position midway between the first and second positions.

2. A fence post as in claim 1 wherein the upright is further provided with a socket, the socket adapted for placement in the ground and wherein the upright has a lower end adapted for mating engagement within the socket.

3. A fence post as in claim 2 wherein the upright and socket are adapted to prevent rotation of the upright within the socket.

4. A fence post as in claim 1 wherein the upright includes an upper portion and a lower portion wherein the upper portion is adapted for pivotal movement with respect to the lower portion, the fence post including shearing means to lock the upright in a vertical position, the shearing means adapted to allow said pivotal movement in the event a threshold bending force is applied to the upper portion.

5. A fence post as in claim 1 wherein the upright includes an upper portion and a lower portion wherein the upper portion is adapted for pivotal movement with respect to the lower portion through a resilient and flexible joint.

6. A fence post as in claim 1 wherein the upright includes an upper portion and a lower portion wherein the upper portion is adapted for pivotal movement with respect to the lower portion, the fence post including biasing means to bias the upright in a vertical position, the biasing means adapted to allow said pivotal movement in the event a threshold bending force is applied to the upper portion.

* * * * *